United States Patent
Pilutti et al.

(10) Patent No.: US 9,002,613 B2
(45) Date of Patent: Apr. 7, 2015

(54) SYSTEM AND METHOD FOR VEHICLE SPEED MONITORING USING HISTORICAL SPEED DATA

(71) Applicant: Ford Global Technologies, LLC, Dearborn, MI (US)

(72) Inventors: Thomas Edward Pilutti, Ann Arbor, MI (US); Jeffrey Dan Rupp, Ann Arbor, MI (US); Dorian Jack Spero, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 13/913,575

(22) Filed: Jun. 10, 2013

(65) Prior Publication Data

US 2013/0274956 A1 Oct. 17, 2013

Related U.S. Application Data

(62) Division of application No. 12/794,841, filed on Jun. 7, 2010, now Pat. No. 8,478,499.

(51) Int. Cl.
*G06F 17/00* (2006.01)
*G08G 1/01* (2006.01)
*G08G 1/052* (2006.01)
*G08G 1/0967* (2006.01)

(52) U.S. Cl.
CPC .............. *G06F 17/00* (2013.01); *G08G 1/0112* (2013.01); *G08G 1/0129* (2013.01); *G08G 1/052* (2013.01); *G08G 1/096716* (2013.01); *G08G 1/096725* (2013.01); *G08G 1/096741* (2013.01); *G08G 1/096775* (2013.01); *G08G 1/096791* (2013.01)

(58) Field of Classification Search
CPC ........... B60T 2220/00; B60T 2220/02; B60W 2520/28; B60W 2530/14; B60W 2540/30; G06F 17/00; G06F 2212/173; G08G 1/01; G08G 1/0104; G08G 1/0108; G08G 1/0112; G08G 1/0116; G08G 1/012; G08G 1/0125; G08G 1/0129; G08G 1/0133; G08G 1/0137; G08G 1/0141; G08G 1/0967; G08G 1/096708; G08G 1/096716; G08G 1/096725; G08G 1/096733; G08G 1/096741; G08G 1/09675; G08G 1/096758; G08G 1/096766; G08G 1/096775; G08G 1/096783; G08G 1/096791
USPC ................ 701/1, 32.1, 93, 121, 408; 180/170
See application file for complete search history.

(56) References Cited

U.S. PATENT DOCUMENTS

| | | | |
|---|---|---|---|
| 6,836,719 | B2 | 12/2004 | Andersson et al. |
| 7,479,897 | B2 | 1/2009 | Gertsch et al. |
| 2002/0128751 | A1 | 9/2002 | Engstrom et al. |
| 2011/0307166 | A1 | 12/2011 | Hiestermann et al. |

OTHER PUBLICATIONS

Tele Atlas B.V., White Paper: Developing Mapping Applications with Speed Profiles, 2009.

*Primary Examiner* — Jerrah Edwards
(74) *Attorney, Agent, or Firm* — Frank A. MacKenzie; Brooks Kushman P.C.

(57) ABSTRACT

A target (not-to-exceed) speed for a vehicle over a road segment ahead of the vehicle is established based on a desired relationship with a speed profile of the segment. The speed profile is generated by analyzing a statistical distribution of historical speed data over the segment collected by probe vehicles. A driver alert is activated if the vehicle is likely to exceed the target speed based on at least one measured vehicle dynamic property. The target speed may be established by identifying a baseline road segment over which the vehicle has previously travelled and which is similar to the approaching road segment, comparing a past speed of the vehicle over the baseline segment with a speed profile of the baseline segment to determine a speed differential, and applying the speed differential to the speed profile of the approaching segment.

7 Claims, 4 Drawing Sheets

SYSTEM AND METHOD FOR VEHICLE SPEED MONITORING USING HISTORICAL SPEED DATA

CROSS-REFERENCE TO RELATED APPLICATIONS

This application is a division of U.S. application Ser. No. 12/794,841 filed Jun. 7, 2010, now U.S. Pat. No. 8,478,499 B2, the disclosure of which is incorporated in its entirety by reference herein.

TECHNICAL FIELD

This invention relates to a speed monitoring system for an automotive vehicle, and more specifically to such a system that establishes a desired speed based on historical speed data for a particular segment of road.

BACKGROUND

It is known to provide the driver of an automotive vehicle with a warning or advisory if the vehicle exceeds a desired maximum speed. In some systems, the desired or allowable maximum speed may be based on legally-set speed limit data stored, for example, in a digital map, or using artificial vision systems to read speed limit signs posted along the route of travel. Other proposed systems use wireless (for example radio frequency or infrared) systems to transmit signals that are received by equipment aboard the vehicle to indicate a speed limit or desired speed.

It is further known to calculate a maximum safe or recommended speed to be driven around an approaching curve and issue a warning if the vehicle exceeds (or is predicted to exceed) that speed. Such methods generally consider the road geometry, primarily the radius of curvature, to determine the recommended speed. U.S. patent application Ser. No. 12/712,446 filed Feb. 25, 2010, and assigned to the assignee of the present application, discloses such methods, and the disclosure is incorporated herein by reference. However, there are many factors other than road geometry that influence how fast a particular vehicle, as driven by a particular driver, may safely and comfortably negotiate a curve. These other factors may include a driver's particular experience level, road surface conditions, merging traffic lanes, and weather conditions.

U.S. Pat. No. 7,479,897 discloses a method of predicting an imminent vehicle rollover situation for heavy trucks driving around relatively sharp curves such as freeway exit/entrance ramps. The method includes building an accurate digital map of roadways, including a road surface bank angle and radius of curvature at each point on the roadway, using data gathered from a fleet of vehicles equipped with GPS tracking systems. A maximum safe speed is then calculated for each data point based on a calculated lateral acceleration the truck will experience when rounding a curve of that bank and curvature. The '897 reference further discusses calculating a speed distribution for each point along a roadway from data gathered by trucks that have previously driven over the road. This historical speed data is used to predict the likelihood that the truck will exceed the maximum safe speed when it reaches the up-coming curve by examining the relationship between the truck's current speed and the historical speed distribution (percentile) for its current point on the road. This method requires data-intensive measurement of road geometry in order to accurately calculate road curvature and bank angle.

Digital map data bases for use in vehicle navigation systems are well known and are evolving to contain GPS data collected by so-called probe vehicles. A probe vehicle is any vehicle equipped with appropriate GPS and related communication systems that allow the vehicle to transmit data to a remote collection point. The probe vehicles together serve as a data collection fleet. The data collected by probe vehicles may include latitude, longitude, absolute time, position error estimate, and vehicle speed. This data may be referenced to an existing map data base to permit roads to be subsequently queried to determine expected speed over a road or a segment thereof. Tele Atlas® is a digital mapping company that utilizes probe vehicle data for driving purposes. Tele Atlas® advertises that it generates speed profiles for road segments that are derived from aggregating and processing hundreds of billions of anonymous GPS measurements from millions of probe vehicles to reflect actual consumer driving patterns. This data helps determine realistic average road way speeds for different times of day and different days of the week.

SUMMARY

According to a described embodiment, the speed of an automotive vehicle is monitored and a vehicle system, such as a warning device, is activated if the vehicle speed is expected to exceed a target speed over an approaching road segment lying ahead of the vehicle. A speed profile of the approaching segment is accessed, the speed profile being generated by analyzing a statistical distribution of historical speed data collected from probe vehicles that have previously travelled over the approaching segment. The target speed is established based on a desired relationship with the speed profile, the desired relationship being based upon at least one of a driver condition factor, a driving conditions factor, a vehicle condition factor, and a driver input factor. The likelihood that the vehicle will exceed the target speed is assessed based, at least in part, on at least one measured vehicle dynamic property.

According to another described embodiment, the target speed is established by identifying a baseline road segment over which the vehicle has previously travelled, comparing a past speed of the vehicle over the baseline segment with a speed profile of the baseline segment, and applying the speed differential to the first speed profile. The baseline road segment may be selected based upon similarity to the approaching road segment in at least one of a curvature, an incline, a bank angle, a camber, a surface quality, and a posted speed limit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
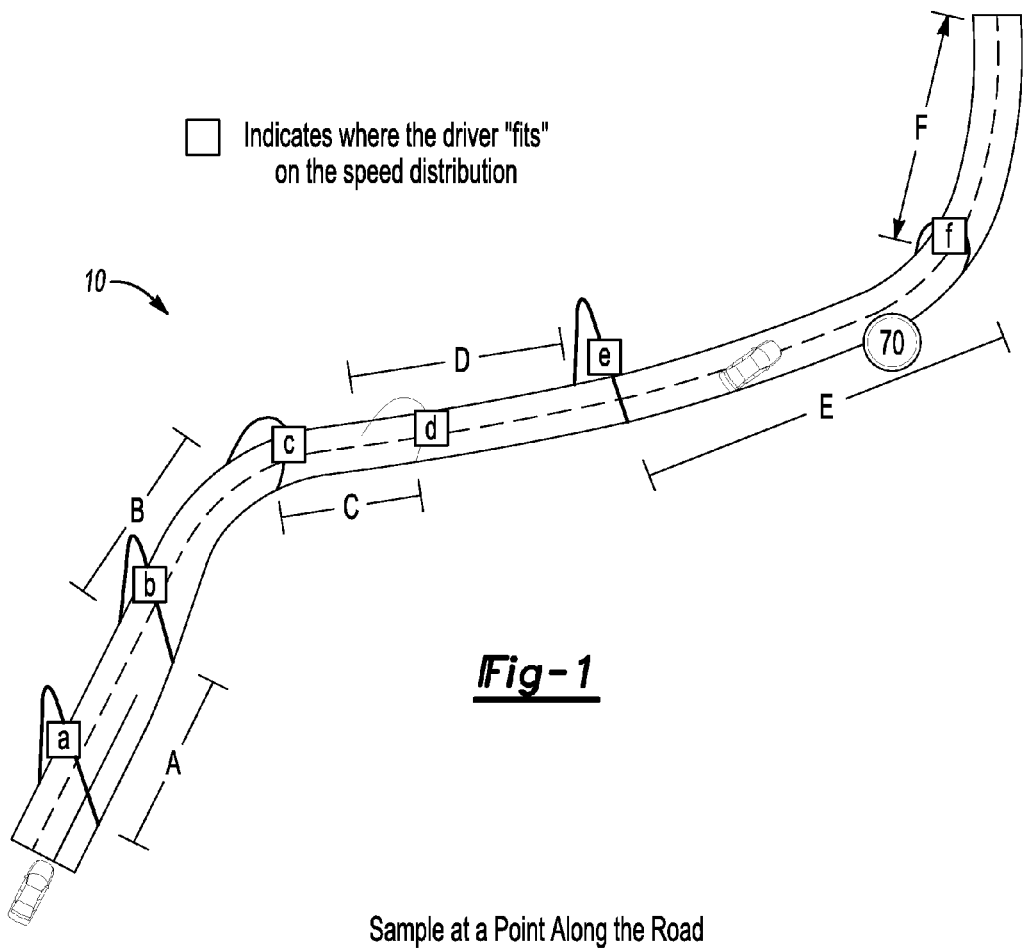
FIG. 1 is a schematic depiction of a section of road divided into segments and depicting speed profiles for each segment.

FIG. 1 is a schematic depiction of a length of roadway 10 divided into six segments labeled A through F. Road segments may be delineated/identified based upon a standard or uniform distance (every 10 meters for example). Or, the segments may be based upon changes in one or more roadway characteristics such as radius of curvature, incline (uphill/downhill), bank angle, camber, road surface quality (rough/smooth, asphalt/concrete), and/or posted speed limit. For example, in FIG. 1 segments A, D, and E are considered to be relatively straight, while segments B, C, and F are considered curved. Adjacent straight segments D and E may be identified as separate segments due to differences in one or more of the other characteristics mentioned above.

At least one historical speed profile is generated for each road segment A-F, the speed profile based upon data collected from probe vehicles that have previously driven over the segment. In FIG. 1, historical speed profiles are identified as a through f related to road segments A through F respectively.

Figure 2:
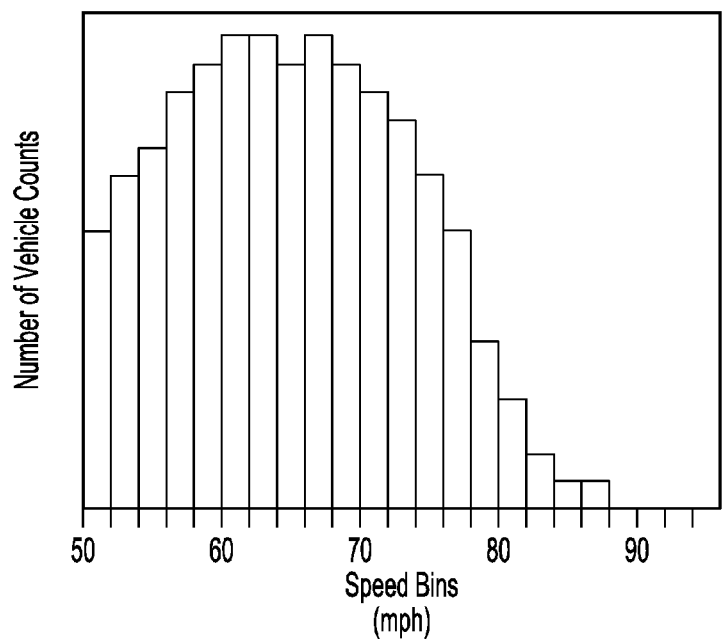
FIG. 2 is a sample of a speed histogram for a road segment.

Each speed profile a-f is generated or calculated by statistically analyzing the cumulative data gathered by the probe vehicles. The data may be plotted graphically as shown in FIG. 2, showing the number of vehicle trips over the segment for falling into given vehicle speed ranges or bins. In the FIG. 2 embodiment, speed bins every 2 miles per hour are used for the plot. A statistical distribution may be determined from the plot. For example, the FIG. 2 distribution may be identified as a normal distribution having a mean value and a standard deviation (sigma).

As discussed in the Background section above, historical vehicles speed data may be collected from probe vehicles equipped with GPS tracking systems so that every time a probe vehicle travels over a given segment of road, its current speed is recorded and/or reported to a collection system such as that operated by Tele Atlas®.

For each speed data point taken by a probe vehicle, it may be also beneficial to identify and record characteristics that are shown or believed to be correlated with the speed driven. Such characteristics may include time-of-day, day-of-week, and weather conditions. With this information, multiple speed profiles may be generated or developed for each road segment. Other multi-dimensional statistical analysis may be performed if such is believed to provide a valuable statistical analysis.

Figure 3:
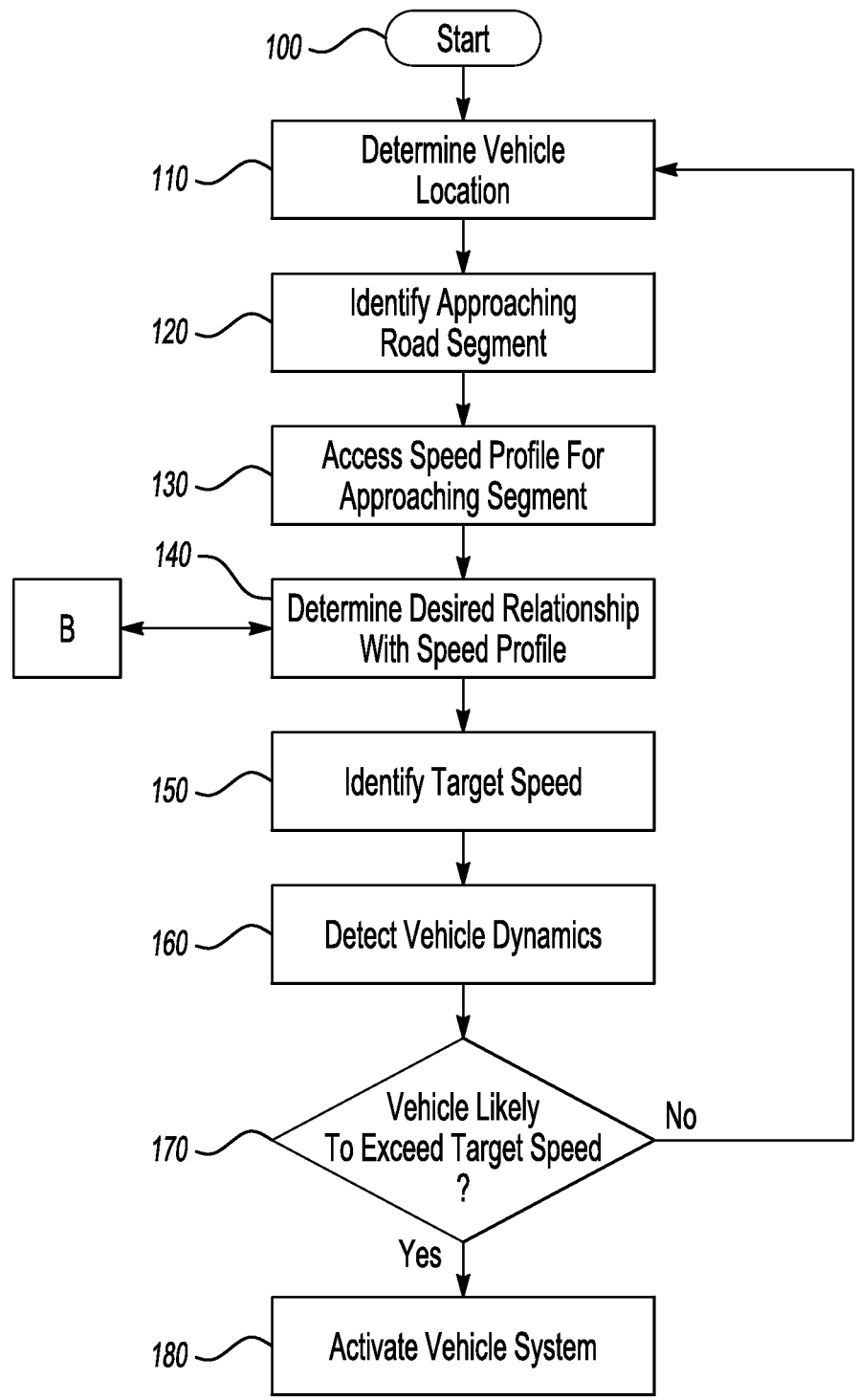
FIG. 3 is a simplified process flow diagram of a method for speed advisory determination.

FIG. 3 illustrates, in flow chart form, a method of monitoring the speed of a vehicle and identifying that the vehicle may be likely to exceed a target speed on a road segment if no corrective action is taken. The method begins at block 100 and progresses to block 110 where the vehicle location is determined. This may be accomplished, for example, utilizing a GPS navigation system and map database, as is well known. Progressing to block 120, the vehicle location is compared with a map data base to identify an approaching road segment, that is, a road segment that lies ahead of the vehicle as it progresses along its current and/or planned route of travel.

At block 130, a speed profile for the approaching segment is accessed. The speed profile may be accessed by wireless communication with a remote database, or the speed profile may be stored onboard the vehicle in an appropriate data storage medium. If the speed profiles in the database include data on any speed-correlated conditions such as the time-of-day, day-of-week, and/or weather at the time the data were taken, the current conditions may be considered so that the speed profile accessed matches one or more of the current condition.

At block 140, a desired relationship between the speed profile accessed for the approaching segment and the current vehicle (or vehicle/driver combination) is determined. The desired relationship may, for example, be expressed in terms of a statistical deviation from a mean value. If the speed profile is identified as having a normal distribution as in FIG. 2, the desired relationship may be that the vehicle should travel at a speed equal to the mean value for the road segment, or at a speed equal to one (or more) sigma above or below the mean value.

Figures 4, 5:
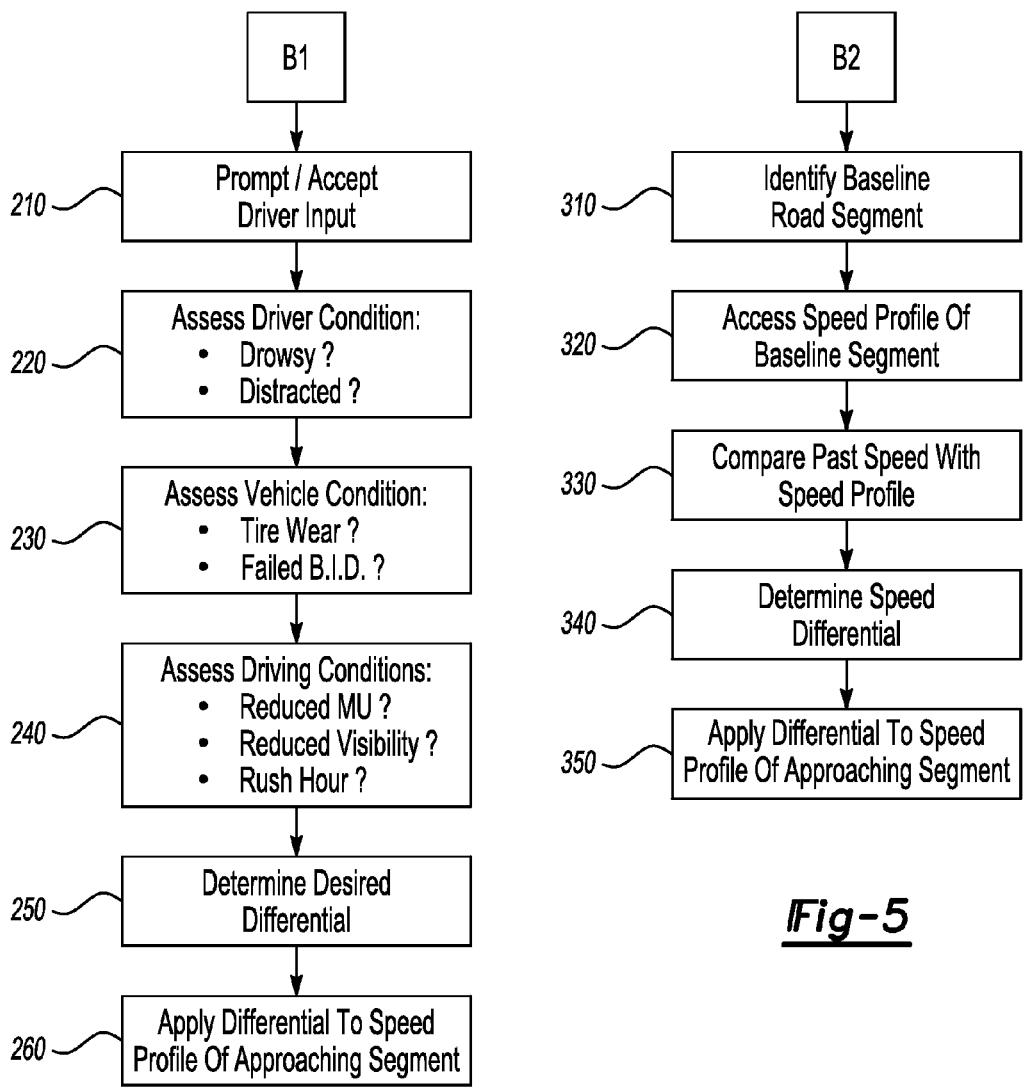
FIG. 4 is a simplified process diagram of a branch method from FIG. 3.
FIG. 5 is a simplified process diagram of an alternative branch method from FIG. 3.

One method for determining the desired relationship is depicted in FIG. 4. At step 210, the driver of the vehicle is prompted or otherwise offered the opportunity to select how fast, in relation to a speed profile, he/she desires to drive on a particular trip. The driver may make this decision and input at the beginning of a trip, for example immediately prior to or after starting the vehicle or putting the vehicle into gear. The driver may make inputs later in the trip if desired. The driver is thus able to make a decision as to how fast, in relation to a historical speed distribution, he/she wishes to drive on a particular trip. The driver may make the input using a manually-operated switch, a touch-pad, a voice command, or any other known method(s).

At block 220, the system may assess and consider factors relating to the driver's condition that may impact her/his ability to drive safely at a particular speed. For example, a driver drowsiness detection system may evaluate the driver's alertness level. Known methods for drowsiness detection monitor behaviors such as blinking, fidgeting, head nodding, etc. Similarly, a level of driver distraction may be evaluated by detecting whether the driver is using systems such as an entertainment system, navigation system, telephone, or other systems and/or controls of the vehicle. If the assessment of driver condition indicates that a lower speed should be driven, this may be used in the determination of the desired relationship with the speed profile.

At block 230, physical conditions of the vehicle that may have an impact upon safe driving speed may be assessed. Examples of such conditions include, but are not limited to, tire tread wear, brake wear, and other any other mechanical or electrical fault that may be indicated by failure of a test administered by an on-board diagnostics (OBD) system.

At block 240, driving conditions external to the vehicle may be assessed for their impact on safe driving speed. Examples of such driving conditions are reduced friction (mu) of the driving surface caused by rain, snow, mud or other conditions, and reduced visibility such as may be caused by darkness or rainy conditions. Another indicator of driving condition may be the time-of-day as it relates to heavy traffic weight, such as during rush hour. The time-of-day may, as discussed above, be taken into account in selection of the speed profile accessed at step 130. However, darkness and/or traffic conditions related to time-of-day may also be assessed separately at this step.

At block 250, a desired differential from the speed profile is calculated considering any one or more of the inputs or factors discussed in relation to steps 210-240 above. The driver input factor at step 210 may completely or partially override the factors in steps 220-240 if desired, or any other order of preference may be established in the vehicle system. In any event, at step 250 it is determined at what point or speed along the selected speed profile the vehicle is desired to travel.

It is possible for the differential determined and used to vary depending on the type of road segment. The type of road segment may be identified by one or more characteristics such as curvature, incline, bank angle, camber, surface quality, and/or posted speed limit. For example, a driver's driving history may shows she/he drives at somewhat faster then the mean speed of a speed profile when the segment is relatively straight, but somewhat below the mean speed of a speed profile when the segment is more curved). In such a case, the differential for relatively straight segments may be "one sigma above mean" (assuming a normal distribution as presented in the FIG. 2 example), while the differential for curved segments may be "one sigma below mean" on curved.

It is to be understood that the mean and sigma (standard deviation) in the above discussion are by way of example only. The distributions, speed profiles, and differentials discussed above may be analyzed and/or calculated from the historical data using any appropriate type of statistical distribution or relationship.

FIG. 5 shows an alternative method of determining a desired relationship between an approaching segment speed profile and a desired target speed. At block 310 a baseline road segment is identified over which the vehicle (or vehicle/driver combination) has previously traveled and for which a past speed traveled by the vehicle is known. The baseline road segment may be selected based on similarity to the approaching road segment, considering factors such as curvature, incline, bank angle, camber, surface quality, and posted speed limit. If the vehicle has previously travelled over the approaching segment, then the approaching segment may be identified/selected as the baseline road segment.

At block 320, the historical speed profile of the baseline segment is accessed, from either a remote data base or onboard storage. At block 330, the past speed at which the vehicle travelled over the baseline segment is compared with the statistical speed profile of the baseline segment. At block 340, a speed differential is determined. The speed differential may be expressed as a variance or difference from a statistical mean, as an absolute speed, or as any type of statistical distribution as discussed in relation to the method of FIG. 4. This speed differential indicates, using past speed data of the vehicle, how fast the vehicle usually travels relative to the speed profile generated from other (probe) vehicle over road segments similar to the approaching segment.

At block 350, the speed differential is applied to the speed profile of the approaching segment. This method has the advantage of considering the historic driving style of the vehicle/driver, and it may be applied even if the approaching segment is brand new to the vehicle/driver by selecting a baseline road segment having characteristics similar to that of the approaching segment.

Returning now to FIG. 3, at block 150, a target speed for the approaching road segment is identified by applying the desired relationship (determined at block 140) to the speed profile of the approaching road segment. It should be noted that one or more of the factors and/or considerations discussed in relation to blocks 210-240 of FIG. 4 may be considered in combination with the methodology of FIG. 5 in order to arrive at a target speed. That is, even if the FIG. 5 method shows that the past speed of the vehicle/driver over a baseline road segment is high relative to a speed profile, the target speed may be adjusted downward if driver condition, vehicle condition, and/or external driving conditions indicate such a speed reduction.

It should be understood that the target speed is neither a "maximum safe" nor a "maximum comfortable" speed. Such terms necessarily relate to a known and specific geometry of the approaching road segment (features such as curve radius and bank angle) and a lateral acceleration that the vehicle will sustain when rounding a curve at a given speed. The target speed determined in this method does not take into account the geometry of the approaching road segment, but rather relies on the speed profile generated from historical data gathered from probe vehicles. This allows the use of a digital map that may not be accurate enough to rely upon to calculate road curvature and bank angle and hence lateral acceleration.

At block 160, one or more vehicle dynamic conditions are detected, including, for example, current vehicle speed and/or current longitudinal acceleration. At block 170, the vehicle dynamic conditions from block 160 are analyzed relative to the target speed to determine whether the vehicle is or is likely to exceed the target speed over the approaching road segment. Other factors may be included in making this target speed comparison, such as an available deceleration distance between the current vehicle position and the approaching road segment and/or an allowable vehicle deceleration rate. Another factor that may be considered is the historic driving style of the vehicle/driver. For example, the "typical" braking rate and/or pattern of the driver when approaching a curve like the approaching segment may be considered. Many other factors may be included in the decision made at block 170, for example, road surface conditions (wet/dry/icy), and vehicle dynamics conditions in addition to current velocity and acceleration, assuming that the vehicle is equipped with sensors to detect such factors. A method of If the vehicle is determined to be unlikely to exceed the target speed without any unusual action taken by the driver (block 170 "NO"), the method returns to block 110. If the vehicle is determined to be likely to exceed the target speed (block 170, "YES"), the method progresses to block 180 and one or more vehicle systems are activated. Possible vehicle systems that may be activated will be discussed below in relation to FIG. 6.

It should be noted that in most cases the desired relationship and target speed will be determined for a specific driver/vehicle combination. As such, any reference to a vehicle may be taken to refer to the driver/vehicle combination when appropriate. The identity of a particular driver driving a vehicle may be communicated to the vehicle system by a personalized key, key fob, RFID "smart" card, or similar known devices. Alternatively, the driver may be identified biometrically, or may be make an input (manually, voice recognition, etc.) identifying himself/herself prior to operating the vehicle.

Figure 6:
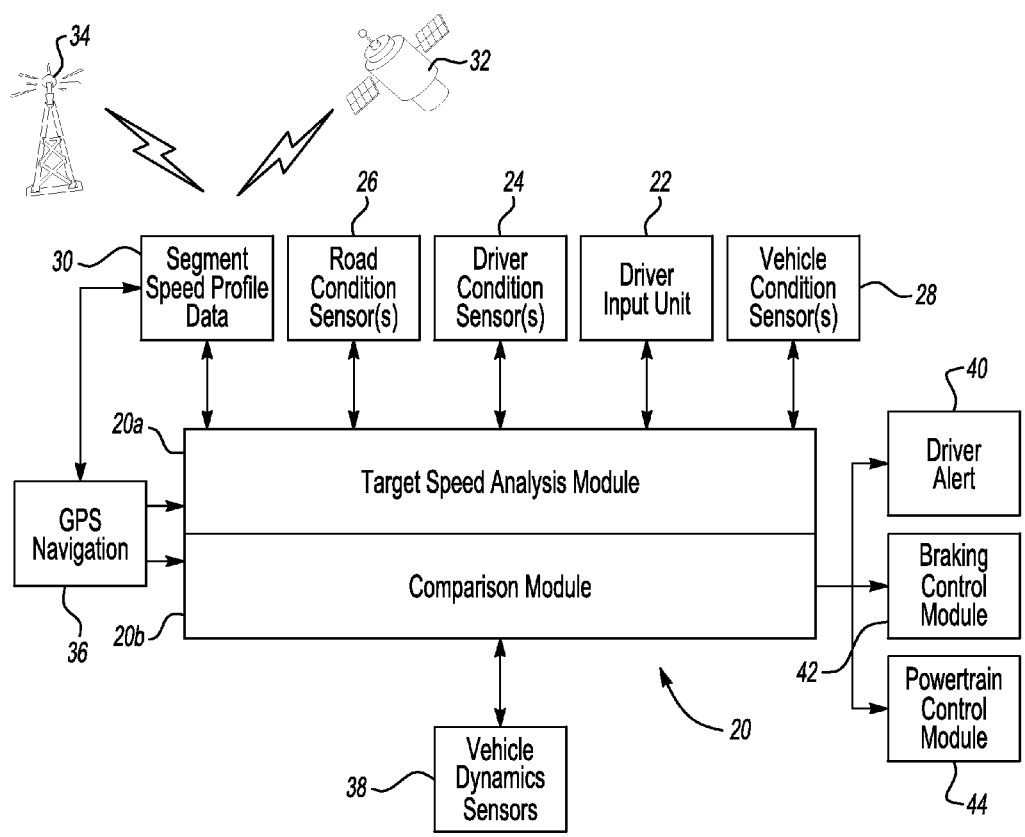
FIG. 6 is a simplified functional block diagram of an embodiment of a speed advisory system.

FIG. 6 depicts a functional block diagram of a system for monitoring the speed of a vehicle and implementing the method(s) described hereinabove. The computational module, generally indicated at 20, is preferably carried onboard the vehicle and may comprise a microprocessor-based unit such as a computer having a central processing unit, memory (RAM and/or ROM), and associated input and output buses. The computational module 20 may be an application-specific integrated circuit or other logic devices known in the art. The computational module 20 may be a portion of a central vehicle main control unit, an interactive vehicle dynamics module, a main safety controller, or may be a stand-alone controller as shown.

Computational module 20 is shown sub-divided into a target speed analysis module 20a and a speed comparison module 20b. This functional division of the module is, however, only for ease and clarity of description and is not to be construed as limiting the possible configuration of the module in any way.

A driver input unit 22 is in electronic communication with computational module 20 and may comprise a control and/or display device with which the driver may make an input indicating a desired relationship with the speed profile. The same control/display device be also prompt the driver to make such an input at appropriate times.

One or more driver condition sensors 24 are in electronic communication with computational module 20. Driver condition sensors 24 may, as discussed above, monitor and assess driver fatigue, alertness, drowsiness, and/or distraction by known techniques.

One or more road/environmental condition sensors 26 are in electronic communication with computational module 20 and monitor/assess conditions external to the vehicle such as road surface condition, weather conditions, etc.

Vehicle conditions sensors 28 may, as described above, monitor and assess various vehicle systems such as tire wear and on board diagnostics (OBD) test results.

A road segment speed profile module 30 may comprise a wireless interface with a remote database (via satellite 32 and/or ground-based antenna 34) and/or an onboard electronic storage medium. Road segment speed profile module 30 provides access to speed profile data associated with approaching road segments and/or baseline road segments.

A GPS navigation system 36 is also interfaced with the computational module 22 to provide location and/or vehicle dynamics measurements.

Vehicle dynamics sensors 38 provide computation module 20 with information regarding the vehicle's current dynamic state, such as speed and acceleration.

Computational module 20 and, in particular, target speed analysis module 21*a*, receive inputs from appropriate systems to allow determination of a target speed for the approaching road segment. Comparison module 20*b* considers the appropriate factors to determine whether or not the vehicle/driver is likely, without an intervention of some type, to exceed the target speed over the approaching segment.

A driver alert system 40, a braking control module 42, and a power train control module 44 are in electronic communication with computational module 20. One of more of these systems may be activated if computational module 20 determines that the vehicle is likely to exceed the target speed. Driver alert system 40 may be activated to provide visual, audible, haptic and/or any other appropriate alert to the driver so that he/she may take action to reduce the vehicle speed over the approaching segment. Braking control module 42 and/or power train control module 44 may be activated to provide automatic interventions to reduce vehicle speed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A method of monitoring the speed of an automotive vehicle comprising:

operating a vehicle navigation system to determine a location of the vehicle relative to an approaching road segment lying ahead of the vehicle;

accessing a first speed profile of the approaching segment, the first speed profile saved in a database and generated by analyzing a statistical distribution of historical speed data collected from probe vehicles that have previously travelled over the approaching segment;

identifying a baseline road segment over which the vehicle has previously travelled;

accessing a second speed profile of the baseline segment, the second speed profile saved in the database and generated by analyzing a statistical distribution of historical speed data collected from probe vehicles that have previously travelled over the baseline segment;

comparing a past speed of the vehicle over the baseline segment with the second speed profile to determine a speed differential; and applying the speed differential to the first speed profile to establish a target vehicle speed over the approaching segment;

assessing whether the vehicle is likely to exceed the target speed over the approaching segment based, at least in part, on a current vehicle speed; and activating a vehicle system to a) notify a vehicle driver of results of the assessment, and/or b) reduce vehicle speed.

2. The method of claim 1 wherein the baseline road segment is selected, at least in part, based upon similarity to the approaching road segment in at least one of a curvature, an incline, a bank angle, a camber, a surface quality, and a posted speed limit.

3. The method of claim 2 wherein the baseline segment is the same as the approaching segment.

4. The method of claim 1 wherein the first speed profile is generated based, at least in part, upon similarity between current speed-correlated conditions and speed-correlated conditions existing at times the historical speed data were collected from the probe vehicles, the speed-correlated conditions comprising at least one of a time-of-day, a day-of-week, and weather conditions.

5. The method of claim 1 wherein the baseline road segment identified is a road segment over which the vehicle has previously travelled when driven by the vehicle driver.

6. A method of monitoring the speed of an automotive vehicle comprising:

operating a vehicle navigation system to determine a location of the vehicle relative to an approaching road segment lying ahead of the vehicle;

accessing a first speed profile of the approaching segment, the first speed profile saved in a database and generated by analyzing a statistical distribution of historical speed data collected from probe vehicles that have previously travelled over the approaching segment, the first speed profile being generated based, at least in part, upon similarity between current speed-correlated conditions and speed-correlated conditions existing at times the historical speed data were collected from the probe vehicles, the speed-correlated conditions comprising at least one of a time-of-day, a day-of-week, and weather conditions;

identifying a baseline road segment over which the vehicle has previously travelled;

accessing a second speed profile of the baseline segment, the second speed profile saved in the database and generated by analyzing a statistical distribution of historical speed data collected from probe vehicles that have previously travelled over the baseline segment;

comparing a past speed of the vehicle over the baseline segment with the second speed profile to determine a speed differential; and applying the speed differential to the first speed profile to establish a target vehicle speed over the approaching segment;

assessing whether the vehicle is likely to exceed the target speed over the approaching segment based, at least in part, on a current vehicle speed; and activating a vehicle system to a) notify a vehicle driver of results of the assessment, and/or b) reduce vehicle speed.

7. A method of monitoring the speed of an automotive vehicle comprising:

operating a vehicle navigation system to determine a location of the vehicle relative to an approaching road segment lying ahead of the vehicle;

accessing a first speed profile of the approaching segment, the first speed profile saved in a database and generated by analyzing a statistical distribution of historical speed data collected from probe vehicles that have previously travelled over the approaching segment;

identifying a baseline road segment over which the vehicle has previously travelled when driven by a driver currently operating the vehicle;

accessing a second speed profile of the baseline segment, the second speed profile saved in the database and generated by analyzing a statistical distribution of historical speed data collected from probe vehicles that have previously travelled over the baseline segment;

comparing a past speed of the vehicle over the baseline segment with the second speed profile to determine a speed differential; and applying the speed differential to the first speed profile to establish a target vehicle speed over the approaching segment;

assessing whether the vehicle is likely to exceed the target speed over the approaching segment based, at least in part, on a current vehicle speed; and activating a vehicle system to a) notify the driver of results of the assessment, and/or b) reduce vehicle speed.

* * * * *